Figure 1:
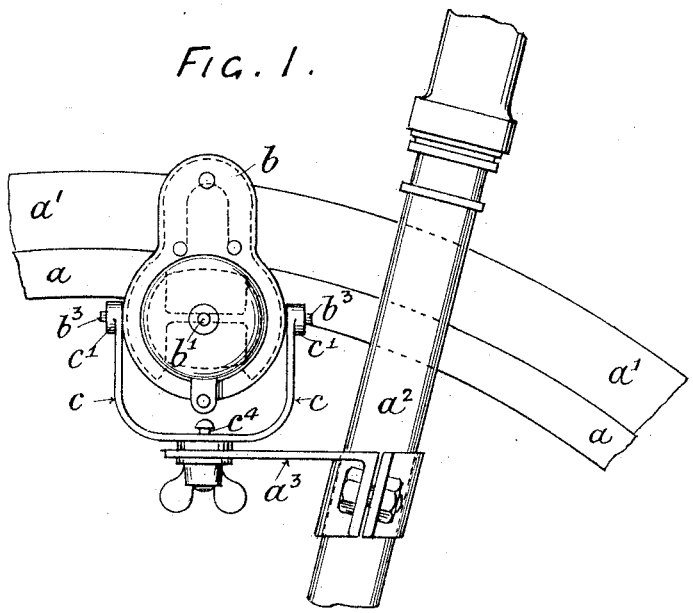

No. 616,343. Patented Dec. 20, 1898.
J. MOORES & H. O. FARRELL.
ELECTRIC GENERATOR FOR CYCLES OR OTHER VEHICLES.
(Application filed May 24, 1898.)
(No Model.) 2 Sheets—Sheet 1.

Fig. 3.ª

WITNESSES:
P. W. Wright
S. C. Connor

INVENTORS
JAMES MOORES
HENRY OLIVER FARRELL
BY
Howson and Howson
THEIR ATTORNEYS.

No. 616,343. Patented Dec. 20, 1898.
J. MOORES & H. O. FARRELL.
ELECTRIC GENERATOR FOR CYCLES OR OTHER VEHICLES.
(Application filed May 24, 1898.)
(No Model.) 2 Sheets—Sheet 2.

FIG. 4.ª

WITNESSES:
P. W. Wright.
S. C. Connor

INVENTORS
JAMES MOORES
HENRY OLIVER FARRELL
BY Howson and Howson
THEIR ATTORNEYS.

UNITED STATES PATENT OFFICE.

JAMES MOORES AND HENRY OLIVER FARRELL, OF MANCHESTER, ENGLAND.

ELECTRIC GENERATOR FOR CYCLES OR OTHER VEHICLES.

SPECIFICATION forming part of Letters Patent No. 616,343, dated December 20, 1898.

Application filed May 24, 1898. Serial No. 681,618. (No model.)

*To all whom it may concern:*

Be it known that we, JAMES MOORES and HENRY OLIVER FARRELL, subjects of the Queen of Great Britain, residing at Manchester, in the county of Lancaster, England, have invented new and useful Improvements in and Connected with Electric Generators for Cycles or other Vehicles, of which the following is a specification.

Our invention relates to improvements in and connected with electric generators for cycles and other vehicles, and is especially applicable for the lighting of cycle or carriage lamps.

In carrying out our invention instead of attaching the electric generator rigidly to its supporting-bracket we mount it on bearings approximately parallel with the plane of the vehicle-wheel, so that it is free to rock within given limits and is yieldingly held against said vehicle-wheel. This movement we control by means of a spring or similar device in such a manner that the said spring tends to rotate the electric generator on its bearings in such direction as to press the generator-pulley against the rim or tire of the vehicle.

When the wheel of the vehicle is revolving, any irregularities in it simply cause the electric generator to turn slightly on its before-mentioned bearings, and thus approximately the same degree of pressure is maintained between the rim or tire and the pulley in spite of these irregularities. Also in cases where the electric generator is attached to a part of the vehicle that moves relatively to the wheels our invention allows of this movement without materially altering the amount of pressure between the before-mentioned pulley and wheel.

When the electric generator is not required to generate current, we turn it on its bearings so that the pulley is moved out of contact with the rim or tire, and hold it in this position by means of any suitable device.

We prefer to use a generator having an armature of the type known as the "shuttle H" or "Siemens" armature, and we have invented for this purpose a special form of armature-core, hereinafter more particularly described.

The drawings annexed hereunto illustrate how our invention may be carried into practical effect.

Figure 2:
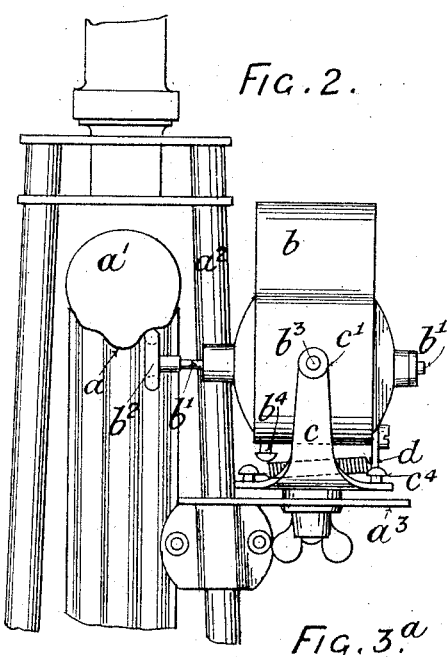
Figure 3:
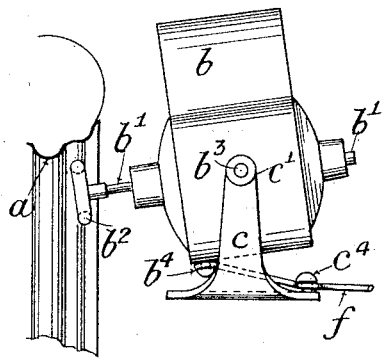
Figure 4:
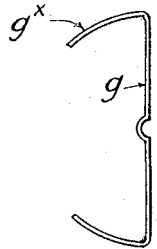
Figure 4:
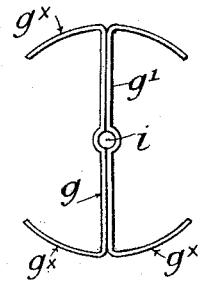
Figure 7:
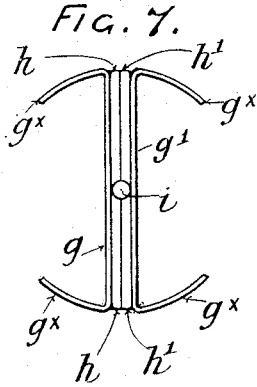

Figure 1 is a side elevation; Fig. 2, a front view of an electric generator for cycles with our improvements applied thereto. Fig. 2 shows the generator in action, and Fig. 3 is a similar view of the same out of action. Fig. 3ª is a detached view of the catch $f$, hereinafter described. Fig. 4 is an edge view, and Figs. 5 and 6 side views seen from planes at right angles to each other, of one of our improved armature-cores above referred to, drawn to a larger scale. Fig. 4ª shows one part of the said core. Fig. 7 shows a modification of the same, hereinafter more particularly referred to.

$a$ is part of the rim of the wheel of the cycle; $a'$, the tire; $a^2$, part of the fork.

$b$ is the case of the generator; $b'$, the spindle of the armature, and $b^2$ the pulley, which actuates the said spindle $b'$ by running in contact with the rim $a$.

The casing $b$ is provided with trunnions $b^3$, fitting in bearings at $c'$ on a stirrup or stand $c$, which is capable of adjustment on the bracket $a^3$, fixed to part $a^2$ of the fork.

The pulley $b^2$ is held in contact with the rim $a$ by the spring $d$, (see Fig. 2,) and a short looped wire $f$, (shown detached at Fig. 3ª,) pivoted at $b^4$ to the case $b$, is hooked over the pin $c^4$ on the stirrup or stand $c$ when it is desired to hold the pulley $b^2$ out of action, as seen at Fig. 3. On releasing $f$ from $c^4$ the spring $d$ will raise the pulley $b^2$ into contact with the rim $a$ again.

In constructing our special armature-core we take two identical or suitable strips of thin or sheet iron and bend over both ends of each strip in the same direction and to such a shape, as seen at Fig. 4ª, that when the two strips are fastened back to back, (see Fig. 4,) with the respective edges of their straight parts $g$ $g'$ parallel or coinciding with one another, the two bends at either end of the united strips shall together form an arc-shaped pole-face, as seen at $g^\times$, corresponding to the pole-face of an ordinary shuttle H or Siemens armature.

Figure 6:
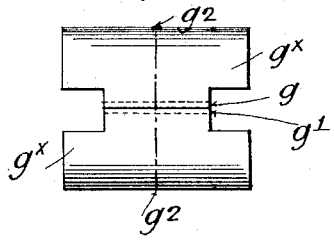

We may instead of using only one pair of iron strips use two pairs, as indicated by the dotted line of junction $g^2$, Fig. 6, (or more than two pairs,) or a number of wires bent and fixed in a similar way to that shown at Fig. 4.

Figure 5:
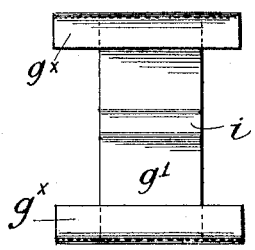

We make the iron strips of a less width at their central portions $g$ $g'$ than at their end $g^\times$, as seen at Figs. 5 and 6.

We may compensate, if requisite, for the reduced mass of metal by increasing the thickness at these central parts by attaching short strips $h$ $h'$ (equal in length to the central parts of $g$ $g'$) of thin or sheet iron along the said strips or by thickening the said central parts in some other convenient manner.

We provide a hole or boss $i$ for mounting our armature on a spindle or shaft in any suitable manner—say as seen at Fig. 4 or Fig. 7.

By this construction of armature-core we reduce weight to a minimum, secure space for a greater number of turns of wire, and simplify and cheapen the construction. We also obtain a current of electricity most suitable for lighting cycle or carriage lamps, as although the lamp may be fully lighted when the cycle is moving at a speed of, say, three miles per hour it will not be burst when the cycle attains a speed of, say, twenty miles an hour.

We claim—

1. An electric generator for a cycle or other vehicle, said generator having a driving-pulley and bearings approximately parallel to the plane of the vehicle-wheel and means whereby the generator is yieldingly pressed against said wheel, as and for the purpose described.

2. An electric generator for vehicles having a shaft, a pulley on said shaft to be revolved by contact with a wheel of said vehicle, said generator secured to bearings at a point near its center of gravity and adapted to rock in said bearings in a plane at right angles to the wheel, and a spring to cause the pulley to bear on the vehicle-wheel, as and for the purpose described.

3. An electric generator (to be applied to a cycle or other vehicle and driven by one of the wheels thereof) mounted on a suitable stirrup in which the said generator can rock, the said stirrup being adjustable in a bracket fixed to the vehicle, substantially as and for the purposes hereinbefore described.

In testimony whereof we have signed our names to this specification in the presence of two subscribing witnesses.

JAMES MOORES.
HENRY OLIVER FARRELL.

Witnesses:
CHARLES A. DAVIES,
JNO. HUGHES.